United States Patent
Brown

(10) Patent No.: US 11,119,843 B2
(45) Date of Patent: Sep. 14, 2021

(54) VERIFYING APPLICATION BEHAVIOR BASED ON DISTRIBUTED TRACING

(71) Applicant: Red Hat, Inc., Raleigh, NC (US)

(72) Inventor: Gary Brown, Farnborough (GB)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/784,541

(22) Filed: Feb. 7, 2020

(65) Prior Publication Data

US 2021/0248023 A1    Aug. 12, 2021

(51) Int. Cl.
*G06F 11/00* (2006.01)
*G06F 11/07* (2006.01)
*G06F 11/34* (2006.01)
*G06Q 10/10* (2012.01)

(52) U.S. Cl.
CPC ........ *G06F 11/079* (2013.01); *G06F 11/0709* (2013.01); *G06F 11/0751* (2013.01); *G06F 11/0778* (2013.01); *G06F 11/3466* (2013.01); *G06Q 10/10* (2013.01)

(58) Field of Classification Search
CPC ............. G06F 11/3466; G06F 11/3636; G06F 11/0778
See application file for complete search history.

(56) References Cited

U.S. PATENT DOCUMENTS

| | | | |
|---|---|---|---|
| 8,997,063 B2 | 3/2015 | Krajec et al. | |
| 9,021,447 B2 | 4/2015 | Krajec et al. | |
| 9,678,820 B2 | 6/2017 | OlmstedThompson et al. | |
| 9,727,311 B2 | 8/2017 | Brown | |
| 9,916,233 B1* | 3/2018 | Qureshi | G06F 9/45533 |
| 10,216,614 B2 | 2/2019 | Alaranta et al. | |
| 10,592,380 B2* | 3/2020 | Borello | G06F 9/544 |
| 2004/0015822 A1* | 1/2004 | Linton | G06F 9/4492 717/104 |
| 2010/0088384 A1 | 4/2010 | Wilkinson et al. | |
| 2013/0283102 A1 | 10/2013 | Krajec et al. | |
| 2015/0261597 A1* | 9/2015 | Darisa | G06F 11/0727 714/48 |
| 2016/0357618 A1* | 12/2016 | Degioanni | G06F 9/45558 |
| 2017/0277616 A1* | 9/2017 | Topiwala | G06F 11/30 |
| 2018/0270122 A1* | 9/2018 | Brown | H04L 69/40 |
| 2019/0324882 A1* | 10/2019 | Borello | G06F 9/545 |
| 2020/0228433 A1* | 7/2020 | Lee | H04L 43/18 |

OTHER PUBLICATIONS

Menezes, B., "Explore high-cardinality trace data with App Analytics," Jul. 12, 2018, available at https://www.datadoghq.com/blog/trace-search-high-cardinality-data/, 7 pages.

* cited by examiner

*Primary Examiner* — Jonathan D Gibson
(74) *Attorney, Agent, or Firm* — Withrow & Terranova, PLLC

(57) ABSTRACT

Systems and methods for distributed tracing of a distributed application include collecting and analyzing trace data within computing containers providing services of the distributed application. Failures of a service to conform to a behavior policy can be immediately flagged, and in some examples this may trigger further analysis by a trace data collection and analysis service. By analyzing trace data at the service level within the computing containers providing the services, failures of a service to conform to a behavior policy can be detected quickly and efficiently.

20 Claims, 6 Drawing Sheets

VERIFYING APPLICATION BEHAVIOR BASED ON DISTRIBUTED TRACING

BACKGROUND

Many modern applications are distributed systems wherein the functionality of the application is divided among a number of services. Each one of the services may be containerized, and the services may be hosted across several different computing devices. To characterize the behavior of a distributed application, distributed tracing is performed. Distributed tracing involves collecting trace data describing the interaction between the services of a distributed application as well as other information about the flow of data and/or execution through the services.

SUMMARY

In one example, a method includes hosting a number of computing containers, each providing a service for a distributed application. A trace data collection and analysis agent is included in each one of the computing containers. The trace data collection and analysis agent collects trace data about the service provided by the computing container it is within, analyzes the trace data to verify a behavior of the service, and, in response to a failure to verify the behavior of the service, annotates the trace data to indicate the failure. By analyzing the trace data at the service level and within the computing container providing the service, failures of a service to conform to a behavior policy can be detected quickly and efficiently.

In one example, the method further includes sending the trace data, including any annotations, to a trace data collection and analysis service. The trace data collection and analysis service further analyzes the trace data to verify a behavior of the distributed application. In one example, the trace data collection and analysis service further analyzes the trace data only if it is annotated.

In one example, the trace data from each one of the computing containers forms a fragment of trace data. The trace data collection and analysis service may further analyze a fragment of trace data only if there is annotated trace data in the fragment of trace data.

In one example, a computing device includes a memory and a processor device coupled to the memory. The processor device is to host a computing container to provide a service for a distributed application and provide a trace data collection and analysis agent within the computing container. The trace data collection and analysis agent collects trace data about the service, analyzes the trace data to verify a behavior of the service, and, in response to a failure to verify a behavior of the service, annotates the trace data to indicate the failure. By analyzing the trace data at the service level and within the computing container providing the service, failures of a service to conform to a behavior policy can be detected quickly and efficiently.

In one example, a computer program product for verifying the behavior of a service provided by a computing container is stored on a non-transitory computer-readable storage medium. The computer program product includes instructions to cause a processor device to host the computing container to provide the service, collect trace data about the service, analyze the trace data to verify a behavior of the service, and, in response to a failure to verify the behavior of the service, annotate the trace data to indicate the failure. By analyzing the trace data at the service level and within the computing container providing the service, failures of a service to conform to a behavior policy can be detected quickly and efficiently.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
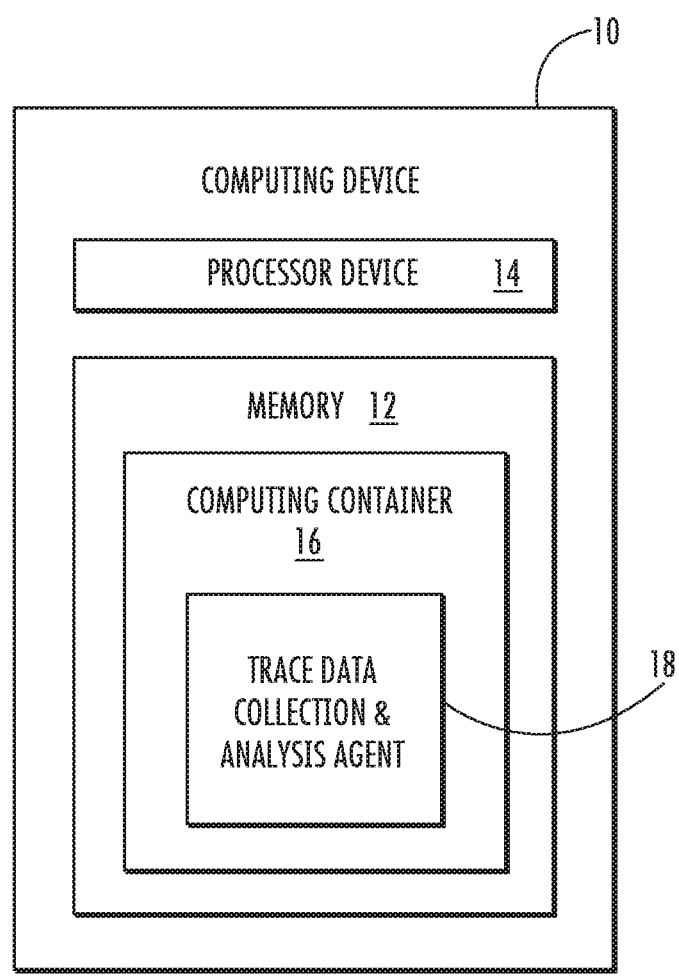
FIG. 1 is a block diagram illustrating a computing device in which examples of the present disclosure may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Several distributed tracing standards have been developed including OpenTracing, OpenCensus, and OpenTelemetry. In conventional distributed tracing, trace data is collected by each service and consolidated at a trace data collection and analysis service, where it is sampled and analyzed. In particular, the trace data collection and analysis service analyzes sampled trace data to verify a behavior of the distributed application. Due to the volume of trace data that can be collected for a distributed application, the trace data collection and analysis service cannot analyze all of the collected trace data without consuming significant resources. Accordingly, the trace data collection and analysis service decides to sample only a subset of the trace data for analysis. The sampling performed by the trace data collection and analysis service may be, for example, head-based sampling or tail-based sampling. To avoid using significant resources in deciding which trace data to sample, the trace data collection and analysis service may perform the sampling randomly or based on some very simple criteria. As a result, only a small percentage of trace data is actually analyzed using conventional distributed tracing and thus invalid behavior of the application can easily be overlooked. In light of the above, there is a need for improved systems and methods for verifying application behavior based on distributed tracing.

As discussed above, conventional distributed tracing collects and consolidates trace data for a distributed application at a central service for verification of the behavior of the application. Due to the volume of trace data that a distributed application can produce, such a service can only analyze a very small subset of the trace data, and must decide which trace data to sample for analysis either randomly or using very simple criteria to avoid using significant resources. Examples of the present disclosure include systems and methods for distributed tracing wherein preliminary analysis of trace data is performed at each service within a distributed application to verify a behavior of the service. If the behavior of the service cannot be verified, the trace data is annotated before it is sent to a trace data collection and analysis service. The trace data collection and analysis service then samples the trace data that has been annotated for further analysis, for example, by verifying the behavior of the application as a whole using the annotated trace data. The systems and methods described herein distribute the analysis of trace data across a distributed application, which allows for the verification of the behavior of the application at the service level as well as the application level. Accordingly, the systems and methods described herein provide analysis of much more of the trace data generated by a distributed application without a significant increase in complexity compared to conventional distributed tracing.

The examples herein facilitate an improvement to computer functionality itself by improving the accuracy of behavior verification in distributed applications using distributed tracing. Thus, the examples are directed to specific improvements in computer functionality.

FIG. 1 is a block diagram of a computing device 10 in which examples of the present disclosure may be practiced. The computing device 10 includes a memory 12 and a processor device 14. The memory 12 stores instructions which, when executed by the processor device 14 cause the processor device 14 to perform one or more actions. In particular, the memory 12 includes instructions which, when executed by the processor device 14 cause the computing device 10 to host a computing container 16. The computing container 16 provides a service for a distributed application. For example, the computing container 16 may provide a load balancing service, a proxy service, an application programming interface (API) service, a web hosting service, a database service, or the like.

The computing container 16 includes a trace data collection and analysis agent 18 therein. The trace data collection and analysis agent 18 collects and analyzes trace data about the service provided by the computing container 16. The trace data may include, for example, a request passed to the service, the originator of a request passed to the service, an execution time of one or more operations provided by the service, one or more entries from a log file associated with the service, a destination for a request generated by the service in response, or the like. The trace data may include one or more fragments of trace data, where a fragment of trace data is a unit of trace data describing the behavior of a particular service being traced. Accordingly, the trace data may include an entirety of trace data collected from every service to fulfill a particular request or used in a particular session, or any subset thereof, such as one or more fragments of trace data.

As discussed above, conventionally trace data is consolidated at a central service for analysis at the application level. In examples of the present disclosure, the trace data collection and analysis agent 18 not only collects trace data, but also analyzes the collected trace data to verify a behavior of the service provided by the computing container 16. The analysis performed by the trace data collection and analysis agent 18 may include, for example, determining if a destination for a request generated by the service is appropriate given the originator of a request received by the service, verifying that one or more operations were performed within a given amount of time, verifying one or more log entries from a log file associated with the service, or the like. In general, any behavior of the service can be verified by the trace data collection and analysis agent 18 based on a desired behavior policy. If the behavior of the service cannot be verified, the trace data collection and analysis agent 18 annotates the trace data to indicate the failure. As discussed in detail below, the trace data (including any annotations) is then sent to a trace data collection service, where it can be further analyzed to verify application level behavior. Since deviations in the expected behavior of the service are annotated in the trace data, the trace data collection and analysis service can easily decide which trace data needs further analysis. Accordingly, the accuracy of behavior verification of the distributed application can be significantly improved.

It should be noted that, because the computing container 16 is a component of the computing device 10, functionality implemented by the computing container 16 may be attributed to the computing device 10 generally. Moreover, in examples where the computing container 16 comprises software instructions that program the processor device 14 to carry out functionality discussed herein, functionality implemented by the computing container 16 may be attributed herein to the processor device 14. The computing container 16 may be provided using any containerization technology. For example, the computing container 16 may be a Docker container, a Linux container (LXC), a Kubernetes container, or the like. The trace data collection and analysis agent 18 may be a sidecar agent within the computing container 16 such that the trace data collection and analysis agent 18 has access to the same resources (e.g., filesystem, logs, etc.) as the service provided by the computing container 16. However, this is not necessary. In some embodiments, the trace data collection and analysis agent 18 may be hosted in a separate computing container or computing device than the service it is collecting and analyzing trace data for. While only one computing container 16 is shown being hosted by the computing device 10, the computing device 10 may host any number of computing containers without departing from the principles described herein. While not shown, the memory 12 may store additional instructions to program the processor to start, stop, and otherwise manage the computing container 16. Further, the memory 12 may store additional instructions to program the processor to perform any number of additional operations to provide functionality of the computing device 10.

Figure 2:
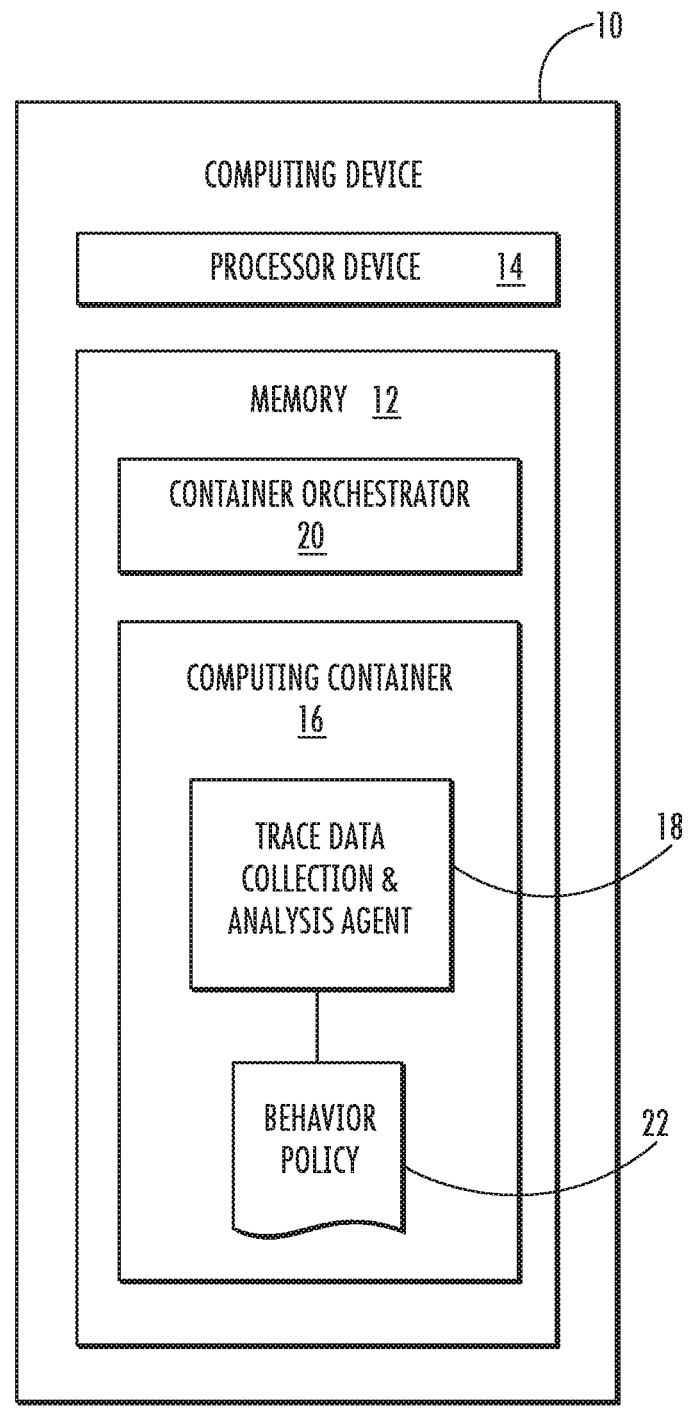
FIG. 2 is a block diagram illustrating a computing device in which examples of the present disclosure may be practiced.

FIG. 2 illustrates the computing device 10 in which additional examples of the present disclosure may be practiced. The computing device 10 shown in FIG. 2 is substantially similar to that shown in FIG. 1, except that the memory 12 further includes instructions which, when executed by the processor device 14 cause the computing device 10 to provide a container orchestrator 20. The container orchestrator 20 may facilitate the operation of the computing container 16 and additional computing containers, enabling the starting, stopping, and management thereof. The memory 12 may further include a behavior policy 22, which is used by the trace data collection and analysis agent 18 to verify the behavior of the service provided by the computing container 16. As discussed above, the behavior policy 22 may include parameters describing a desired behavior of the service such as a destination for a request generated by the service for a given originator of a request received by the service, an amount of time in which one or more operations should be performed, or the like. In general, the behavior policy 22 may describe any desired behavior of the service that can be verified by the trace data collection and analysis agent 18. In some embodiments, the behavior policy 22 may describe parameters or rules associated with specific information generated by or otherwise used by the distributed application, such as a transaction limit associated with a particular customer profile. In such an embodiment, verifying the behavior of the distributed application may include verifying that an order total is within the transaction limit associated with the customer profile.

Figure 3:
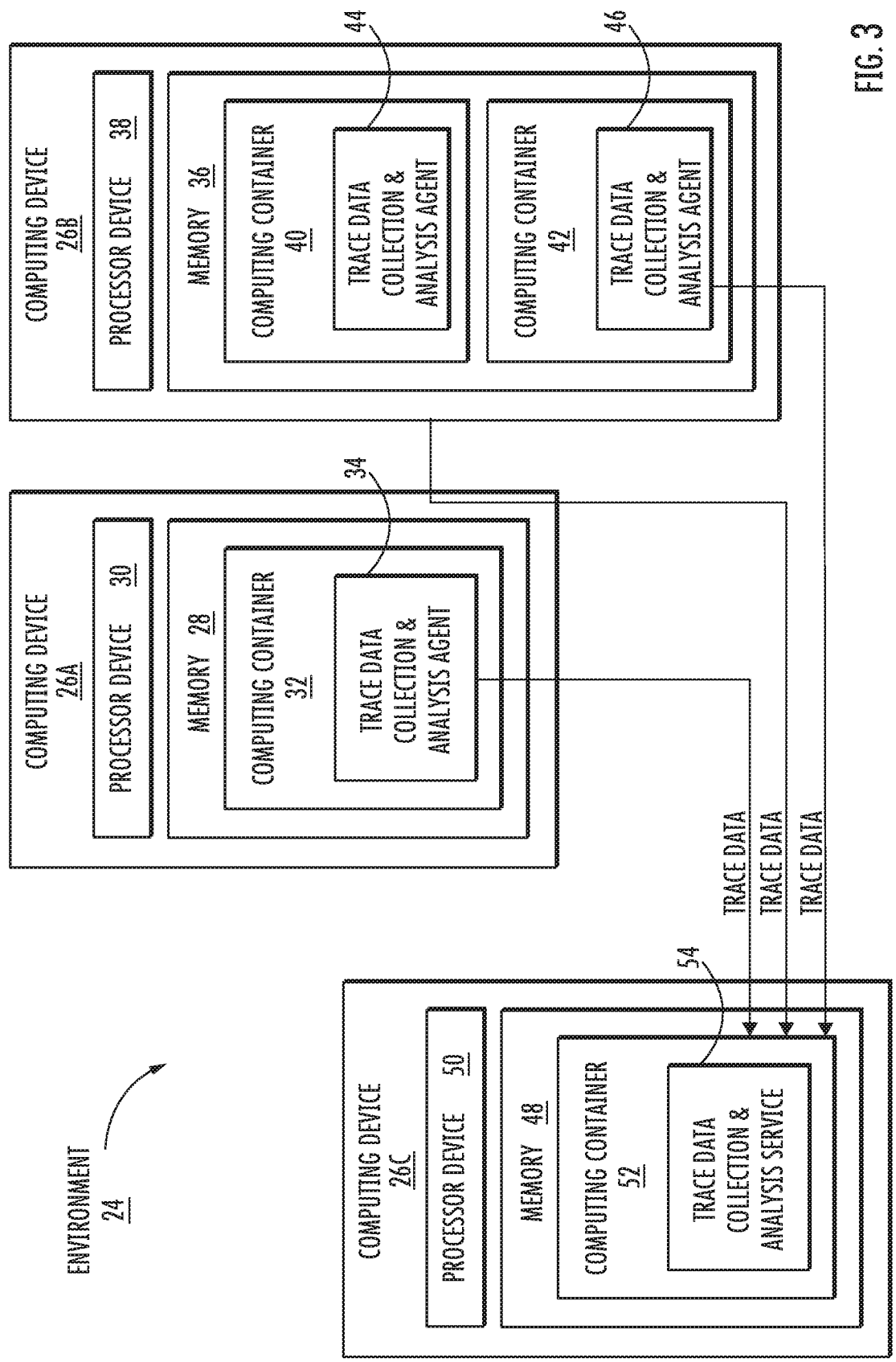
FIG. 3 is a block diagram illustrating an environment in which examples of the present disclosure may be practiced.

FIG. 3 illustrates an environment 24 in which examples of the present disclosure may be practiced. The environment 24 includes a first computing device 26A, a second computing device 26B, and a third computing device 26C. The first computing device 26A includes a first memory 28 and a first processor device 30. The first memory 28 stores instructions which, when executed by the first processor device 30 cause the first computing device 26A to host a first computing container 32. The first computing container 32 provides a first service for a distributed application. For example, the first computing container 32 may provide a load balancing service, a proxy service, an API service, a web hosting service, a database service, or the like.

The first computing container 32 includes a first trace data collection and analysis agent 34 therein. The first trace data collection and analysis agent 34 operates as discussed above to collect and analyze trace data about the first service provided by the first computing container 32 to verify a behavior of the first service. If the first trace data collection and analysis agent 34 fails to verify a behavior of the first service, the first trace data collection and analysis agent 34 annotates the trace data to indicate the failure.

The second computing device 26B includes a second memory 36 and a second processor device 38. The second memory 36 stores instructions which, when executed by the second processor device 38 cause the second computing device 26B to host a second computing container 40 and a third computing container 42. The second computing container 40 provides a second service for the distributed application. The third computing container 42 provides a third service for the distributed application. The second service and the third service may be any type of service as discussed above.

The second computing container 40 includes a second trace data collection and analysis agent 44 therein. The second trace data collection and analysis agent 44 operates as discussed above to analyze and collect trace data about the second service provided by the second computing container 40 to verify a behavior of the second service. If the second trace data collection and analysis agent 44 fails to verify a behavior of the second service, the second trace data collection and analysis agent 44 annotates the trace data to indicate the failure.

The third computing container 42 includes a third trace data collection and analysis agent 46 therein. The third trace data collection and analysis agent 46 operates as discussed above to analyze and collect trace data about the third service provided by the third computing container 42 to verify a behavior of the third service. If the third trace data collection and analysis agent 46 fails to verify a behavior of the third service, the third trace data collection and analysis agent 46 annotates the trace data to indicate the failure.

The third computing device 26C includes a third memory 48 and a third processor device 50. The third memory 48 stores instructions which, when executed by the third processor device 50 cause the third computing device 26C to host a fourth computing container 52. The fourth computing container 52 provides a trace data collection and analysis service 54. Each one of the first trace data collection and analysis agent 34, the second trace data collection and analysis agent 44, and the third trace data collection and analysis agent 46 send the trace data that they collect and optionally annotate to the trace data collection and analysis service 54. The first trace data collection and analysis agent 34, the second trace data collection and analysis agent 44, and the third trace data collection and analysis agent 46 may each provide a fragment of trace data and the combination of the fragments of trace data may be grouped to provide a complete set of trace data for one or more requests or sessions within the distributed application. The trace data collection and analysis service 54 further analyzes the trace data from the first trace data collection and analysis agent 34, the second trace data collection and analysis agent 44, and the third trace data collection and analysis agent 46 to verify a behavior of the distributed application. Because trace data that potentially identifies the failure of one or more of the first service, the second service, and the third service to conform to an expected behavior is annotated, the trace data collection and analysis service 54 can easily choose which trace data to sample for further analysis, while ignoring or minimally processing trace data that is not annotated. In some examples, the trace data collection and analysis service 54 only samples and analyzes trace data that is annotated by the first trace data collection and analysis agent 34, the second trace data collection and analysis agent 44, or the third trace data collection and analysis agent 46. The trace data collection and analysis service 54 may only analyze fragments of trace data within the complete set of trace data that are annotated, or may analyze the complete set of trace data if any fragment within the trace data is annotated.

By performing verification of behavior at the service level and annotating any potential deviations from a desired behavior, essentially flagging them for later analysis, the accuracy of behavior verification across the distributed application can be significantly improved. By distributing the analysis of trace data across the distributed application, the aforementioned improvements in accuracy can be achieved without significant resource consumption.

It should be noted that, because the first computing container 32 is a component of the first computing device 26A, functionality implemented by the first computing container 32 may be attributed to the first computing device 26A generally. Moreover, in examples where the first computing container 32 comprises software instructions that program the first processor device 30 to carry out functionality discussed herein, functionality implemented by the first computing container 32 may be attributed herein to the first processor device 30. Similarly, functionality implemented by the second computing container 40 and the third computing container 42 may be attributed to the second computing device 26B or the second processor device 38. Further, functionality implemented by the fourth computing container 52 may be attributed to the third computing device 26C or the third processor device 50. Generally, the functionality of any of the computing containers described herein can be attributed to the computing device hosting the computing container or a processor device therein.

While the first computing device 26A, the second computing device 26B, and the third computing device 26C show a certain number of computing containers therein, these computing devices 26 can host any number of computing containers without departing from the principles of the present disclosure. In general, the computing containers providing the various services for the distributed application may be hosted across any number of computing devices including a single computing device, a separate computing device for each service, or anything in between. While the first trace data collection and analysis agent 34, the second trace data collection and analysis agent 44, and the third trace data collection and analysis agent 46 are shown as being within the first computing container 32, the second computing container 40, and the third computing container 42 such that they may be provided as sidecar agents therein, they may also be hosted in a separate from the computing container hosting the service they collect and analyze trace data for in various embodiments, and may even be hosted in a different computing device than the one providing the service they collect and analyze trace data for. The trace data collection and analysis service 54 may be hosted in the same computing device as the services for the distributed application or a different computing device. As discussed above, the computing containers discussed herein may be Docker containers, LXC containers, Kubernetes containers, or any other type of containers. While not shown in FIG. 3, the memory of each one of the computing devices 26 may include instructions which, when executed by the processing devices thereon provide a container orchestrator for starting, stopping, and management of any computing containers thereon. Further, while the trace data collection and analysis service 54 is shown as a single service provided by a single computing container, the trace data collection and analysis service 54 may be made up of multiple services, each provided by the same or a different computing container on the same computing device or different computing devices.

Figure 4:
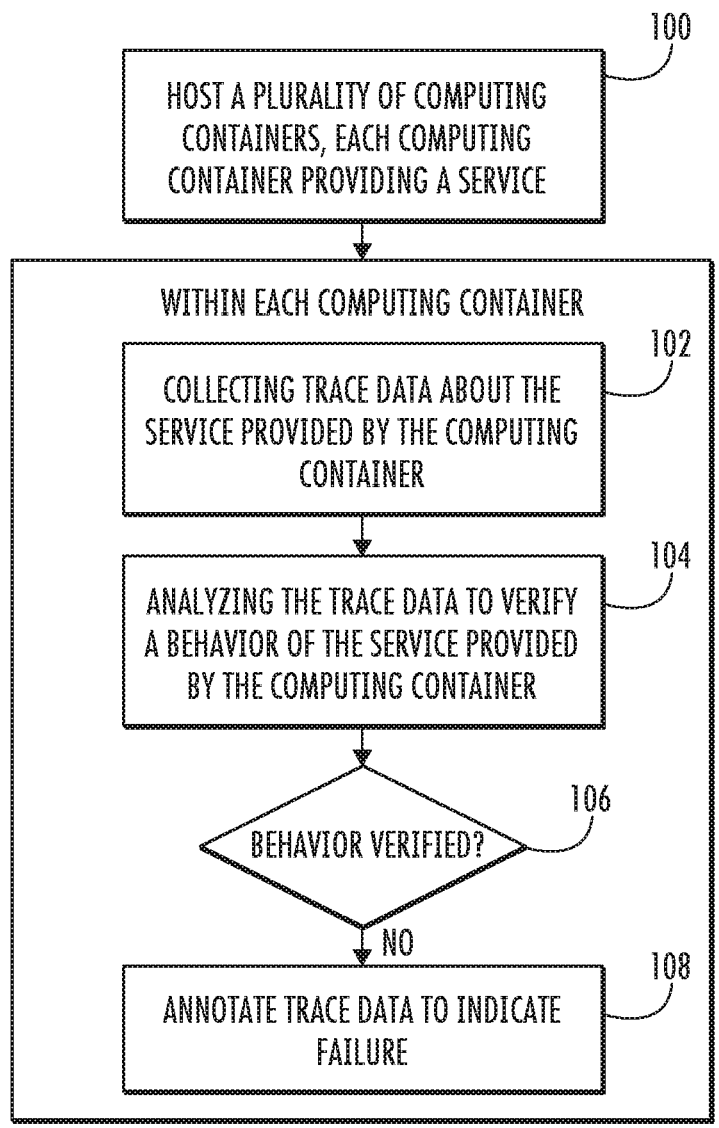
FIG. 4 is a flow diagram illustrating a method for verifying application behavior based on distributed tracing according to one example of the present disclosure.

FIG. 4 is a flow diagram illustrating a method for performing distributed tracing according to one example of the present disclosure. First, a plurality of computing containers are hosted in any number of computing devices, each one of the computing containers providing a service that is part of a distributed application (block 100). As discussed above, the computing containers may be any type of computing containers such as Docker containers, Linux containers, Kubernetes containers, or the like. Within each one of the computing containers, trace data about the service being provided by the computing container is collected (block 102). As discussed above, the trace data may include for example, a request passed to the service, the originator of a request passed to the service, an execution time of one or more operations provided by the service, one or more entries from a log file associated with the service, a destination for a request generated by the service in response, or the like. The trace data is analyzed to verify a behavior of the service provided by the computing container (block 104). Analyzing the trace data may include, for example, determining if a destination for a request generated by the service is appropriate given the originator of a request received by the service, verifying that one or more operations were performed within a given amount of time, verifying one or more log entries from a log file associated with the service, or the like. It is then determined whether the behavior of the service is verified (block 106). If there is a failure to verify the behavior of the service, the trace data is annotated to indicate the failure (block 108). If the behavior of the service is verified, the process can end.

The process steps described in blocks 102-108 may be performed by a trace data collection and analysis agent within the computing container as discussed above. To verify the behavior of the service, the trace data collection and analysis agent may refer to a behavior policy as discussed above. A container orchestrator may facilitate the starting, stopping, and management of the computing container.

Figure 5:
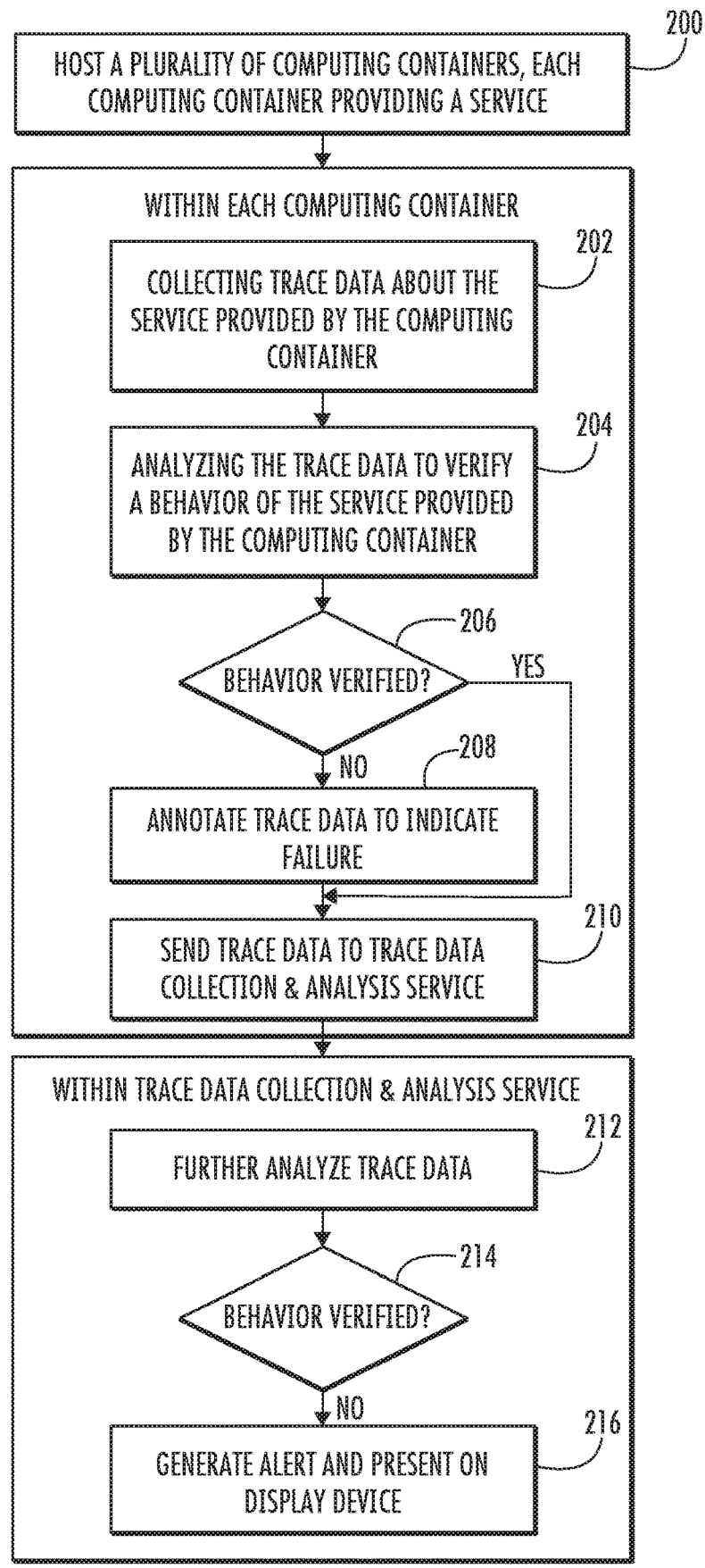
FIG. 5 is a flow diagram illustrating a method for verifying application behavior based on distributed tracing according to one example of the present disclosure.

FIG. 5 is a flow diagram illustrating a method for performing distributed tracing according to an additional example of the present disclosure. First, a plurality of computing containers are hosted in any number of computing devices, each one of the computing containers providing a service that is part of a distributed application (block 200). As discussed above, the computing containers may be any type of computing containers such as Docker containers, Linux containers, Kubernetes containers, or the like. Within each one of the computing containers, trace data about the service being provided by the computing container is collected (block 202). As discussed above, the trace data may include for example, a request passed to the service, the originator of a request passed to the service, an execution time of one or more operations provided by the service, one or more entries from a log file associated with the service, a destination for a request generated by the service in response, or the like. The trace data is analyzed to verify a behavior of the service provided by the computing container (block 204). Analyzing the trace data may include, for example, determining if a destination for a request generated by the service is appropriate given the originator of a request received by the service, verifying that one or more operations were performed within a given amount of time, verifying one or more log entries from a log file associated with the service, or the like. It is then determined whether the behavior of the service is verified (block 206). If there is a failure to verify the behavior of the service, the trace data is annotated to indicate the failure (block 208) and the trace data, including the annotations, is sent to a trace data collection and analysis service (block 210). If the behavior of the service is verified, the annotation step is skipped and the trace data is sent to the trace data collection and analysis service (block 210) without annotations.

Outside of each one of the computing containers, for example at the trace data collection and analysis service, the trace data from each one of the computing containers is further analyzed (block 212) to verify a behavior of the distributed application. The trace data from each one of the computing containers for each service in the distributed application may include fragments of trace data from every service used to fulfill a particular request or used in a particular session. Analyzing the trace data from each one of the computing containers to verify a behavior of the distributed application may include analyzing a fragment of trace data from a single service, analyzing fragments of trace data from several services, analyzing all trace data from all of the services, or any combination of the above. In some examples, only the trace data that has been annotated is sampled and thus further analyzed. This may mean that a complete set of trace data related to a particular request or session is analyzed if any fragment of trace data therein is annotated, or may mean that only annotated fragments of trace data within a complete set of trace data are analyzed. A determination is made regarding whether the behavior of the distributed application is verified (block 214). If there is a failure to verify the behavior of the distributed application, an alert can be generated and presented on a display device (block 216). If the behavior of the distributed application is verified, the process can end.

By performing verification of behavior at the service level and annotating any potential deviations from a desired behavior, essentially flagging them for later analysis, the accuracy of behavior verification across the distributed application can be significantly improved. By distributing the analysis of trace data across the distributed application, the aforementioned improvements in accuracy can be achieved without significant resource consumption.

Figure 6:
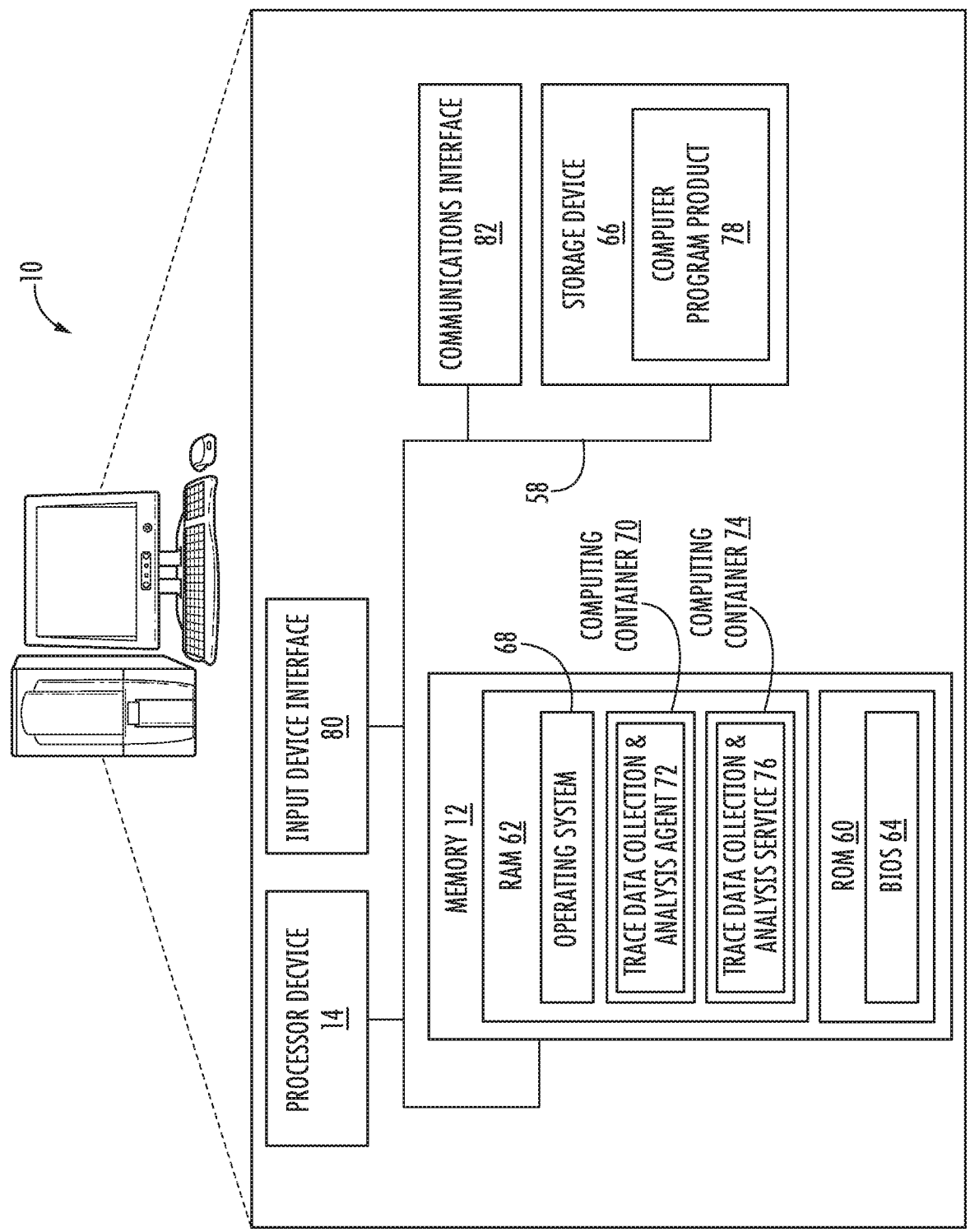
FIG. 6 is a block diagram of a computing device in which examples of the present disclosure may be practiced.

FIG. 6 is a block diagram of the computing device 10 suitable for implementing examples of the present disclosure. The computing device 10 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 10 includes the memory 12, the processor device 14, and a system bus 58. The system bus 58 provides an interface for system components including, but not limited to, the memory 12 and the processor device 14. The processor device 14 can be any commercially available or proprietary processor.

The system bus 58 may be any of several types of bus structures that may further interconnect to a memory bus (with or without a memory controller), a peripheral bus, and/or a local bus using any of a variety of commercially available bus architectures. The memory 12 may include non-volatile memory 60 (e.g., read-only memory (ROM), erasable programmable read-only memory (EPROM), electrically erasable programmable read-only memory (EEPROM), etc.), and volatile memory 62 (e.g., rand-access memory (RAM)). A basic input/output system (BIOS) 64 may be stored in the non-volatile memory 60 and can include the basic routines that help to transfer information between elements within the computing device 10. The non-volatile memory 60 may also include a high-speed RAM, such as static RAM, for caching data.

The computing device 10 may further include or be coupled to a non-transitory computer-readable storage medium such as a storage device 66, which may comprise, for example, an internal or external hard disk drive (HDD) (e.g., enhanced integrated drive electronics (EIDE) or serial advanced technology attachment (SATA)), for storage, flash memory, or the like. The storage device 66 and other drives associated with computer-readable media and computer-usable media may provide non-volatile storage of data, data structures, computer-readable instructions, and the like. Although the description of computer-readable media above refers to an HDD it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 66 and in the volatile memory 62, including an operating system 68 and one or more program modules, such as a computing container 70 including a trace data collection and analysis agent 72, a computing container 74 including a trace data collection and analysis service 76, or the like, which may implement the functionality described herein in whole or in part.

All or a portion of the examples may be implemented as a computer program product 78 stored on a transitory or non-transitory computer-usable or computer-readable storage medium, such as the storage device 66, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the computing container 70 including the trace data collection and analysis agent 72, the computing container 74 including the trace data collection and analysis service 76, or both, may serve as a controller, or a control system, for the computing device 10 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 14 through an input device interface 80 that is coupled to the system bus 58 but can be connected by other interfaces such as parallel port, an Institute of Electrical and Electronic Engineers (IEEE) 1394 serial port, a Universal Serial Bus (USB) port, an IR interface, and the like.

The computing device 10 may also include a communications interface 82 for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   hosting a plurality of computing containers, each one of the plurality of computing containers to provide a service for a distributed application; and
   providing a trace data collection and analysis agent within each one of the plurality of computing containers, the trace data collection and analysis agent to:
   collect trace data about the service provided by the one of the plurality of computing containers containing the trace data collection and analysis agent;
   analyzing the trace data to verify a behavior of the service provided by the one of the computing containers containing the trace data collection and analysis agent; and
   in response to a failure to verify the behavior of the service provided by the one of the computing containers containing the trace data collection and analysis agent, annotating the trace data to indicate the failure.

2. The method of claim 1 wherein the trace data collection and analysis agent is further to send the trace data to a trace data collection and analysis service.

3. The method of claim 1 further comprising further analyzing the trace data by the trace data collection and analysis service to verify the behavior of the distributed application.

4. The method of claim 3 further comprising in response to a failure to verify the behavior of one or more of the services by the trace data collection service, generating an alert and presenting it on a display device.

5. The method of claim 3 wherein the trace data is further analyzed by the trace data collection and analysis service only if it is annotated.

6. The method of claim 5 wherein the trace data from each one of the trace data collection and analysis agents forms a fragment of trace data in a larger set of trace data.

7. The method of claim 5 wherein the trace data from each one of the trace data collection and analysis agents is further analyzed by the trace data collection and analysis service if the trace data from any of the trace data collection and analysis agents is annotated.

8. The method of claim 7 wherein further analyzing the trace data comprises one or more of:
verifying an order of a series of request between two or more of the services;
verifying an amount of time it takes one or more of the services to process a request; and
verifying that information in one of a request and a response between two or more of the services meets a criteria.

9. The method of claim 1 wherein the trace data collection and analysis agent is a sidecar agent within the one of the plurality of computing containers containing the trace data collection and analysis agent.

10. The method of claim 1 wherein each one of the plurality of computing containers is one of a Docker container, a Linux container, and a Kubernetes container.

11. The method of claim 1 wherein at least two of the plurality of computing containers are hosted on different computing devices.

12. A computing system, comprising:
at least one computing device comprising:
a memory; and
a processor device coupled to the memory to:
host a plurality of computing containers to provide a service for a distributed application; and
provide a trace data collection and analysis agent within each of the plurality of computing containers, the trace data collection and analysis agent to:
collect trace data about the service;
analyze the trace data to verify a behavior of the service; and
in response to a failure to verify the behavior of the service, annotate the trace data to indicate the failure.

13. The computing device of claim 12 wherein the trace data collection and analysis agent is further to send the trace data to a trace data collection service.

14. The computing device of claim 12 wherein the trace data forms a fragment of trace data in a larger set of trace data.

15. The computing device of claim 12 wherein the trade data collection and analysis agent is a sidecar agent within the computing container.

16. The computing device of claim 12 wherein the computing container is one of a Docker container, a Linux container, and a Kubernetes container.

17. A computer program product for verifying a behavior of a service provided by a plurality of computing containers, the computer program product stored on a non-transitory computer-readable storage medium and including instructions to cause a processor device to:
host the plurality of computing containers to provide the service; and
provide a trace data collection and analysis agent within each of the plurality of computing containers, the trace data collection and analysis agent to:
collect trace data about the service;
analyze the trace data to verify a behavior of the service; and
in response to a failure to verify the behavior of the service, annotate the trace data to indicate the failure.

18. The computer program product of claim 17 wherein the trace data collection and analysis agent is further to send the trace data to a trace data collection service.

19. The computer program product of claim 17 wherein the trace data forms a fragment of trace data in a larger set of trace data.

20. The computer program product of claim 17 wherein the trace data collection and analysis agent is a sidecar agent within the computing container.

* * * * *